(12) United States Patent
Kim et al.

(10) Patent No.: US 9,489,092 B2
(45) Date of Patent: Nov. 8, 2016

(54) DISPLAY DEVICE HAVING TOUCH SENSOR AND MANUFACTURING METHOD THEREOF

(71) Applicant: Samsung Display Co., Ltd., Yongin (KR)

(72) Inventors: Ki-Hoon Kim, Yongin (KR); Hee-Sang Park, Yongin (KR)

(73) Assignee: Samsung Display Co., Ltd., Yongin-si (KR)

(*) Notice: Subject to any disclaimer, the term of this patent is extended or adjusted under 35 U.S.C. 154(b) by 45 days.

(21) Appl. No.: 14/157,058

(22) Filed: Jan. 16, 2014

(65) Prior Publication Data

US 2015/0002756 A1    Jan. 1, 2015

(30) Foreign Application Priority Data

Jun. 28, 2013 (KR) .......................... 10-2013-0075117

(51) Int. Cl.
  *G06F 3/044* (2006.01)
  *G06F 3/041* (2006.01)

(52) U.S. Cl.
  CPC .............. *G06F 3/044* (2013.01); *G06F 3/0412* (2013.01)

(58) Field of Classification Search
  CPC ... G02F 1/13338; G06F 3/0412; G06F 3/044
  See application file for complete search history.

(56) References Cited

U.S. PATENT DOCUMENTS

| | | | |
|---|---|---|---|
| 9,046,955 B1 * | 6/2015 | Lee .................... | G06F 3/0412 |
| 9,122,362 B2 * | 9/2015 | Park ................... | G06F 3/044 |
| 2009/0321764 A1 * | 12/2009 | Lee .................... | H01L 27/3246 257/98 |
| 2010/0013745 A1 * | 1/2010 | Kim .................... | G06F 3/0412 345/76 |
| 2010/0044691 A1 * | 2/2010 | Hong ................... | H01L 27/3276 257/40 |
| 2010/0110041 A1 * | 5/2010 | Jang .................... | G06F 3/0412 345/174 |
| 2010/0309150 A1 * | 12/2010 | Lee .................... | G06F 3/0412 345/173 |
| 2011/0267295 A1 * | 11/2011 | Noguchi ............... | G06F 3/0416 345/173 |
| 2012/0242597 A1 * | 9/2012 | Hwang ................. | G06F 3/0412 345/173 |
| 2012/0249454 A1 * | 10/2012 | Teraguchi ............. | G06F 3/0412 345/173 |
| 2013/0194205 A1 * | 8/2013 | Park .................... | G06F 3/044 345/173 |
| 2013/0335366 A1 * | 12/2013 | Lee .................... | G06F 3/044 345/174 |
| 2014/0027729 A1 * | 1/2014 | So ...................... | H01L 51/5056 257/40 |
| 2014/0085251 A1 * | 3/2014 | Cok .................... | G06F 3/0412 345/174 |
| 2014/0210767 A1 * | 7/2014 | Hur .................... | G06F 3/0412 345/174 |
| 2014/0313438 A1 * | 10/2014 | Jun .................... | G06F 3/0412 349/12 |
| 2015/0014639 A1 * | 1/2015 | Chung ................. | H01L 27/3276 257/40 |
| 2015/0097808 A1 * | 4/2015 | Roh .................... | G06F 3/0412 345/174 |

FOREIGN PATENT DOCUMENTS

| | | |
|---|---|---|
| KR | 10-2006-0123810 | 12/2006 |
| KR | 10-2007-0071808 | 7/2007 |

* cited by examiner

*Primary Examiner* — Ilana Spar
*Assistant Examiner* — Mihir K Rayan
(74) *Attorney, Agent, or Firm* — H.C. Park & Associates, PLC

(57) ABSTRACT

A display device having a touch sensor and a manufacturing method thereof. The display device includes a pixel defining layer, first electrodes, an emissive layer, second electrodes, and an insulating layer. The first electrodes are exposed and arranged through the pixel defining layer. The emissive layer is formed on each first electrode. Each second electrode is connected to the emissive layer, and the second electrodes are arranged to be spaced apart from each other. The insulating pattern is formed on the pixel defining layer exposed between adjacent second electrodes.

13 Claims, 9 Drawing Sheets

DISPLAY DEVICE HAVING TOUCH SENSOR AND MANUFACTURING METHOD THEREOF

CROSS-REFERENCE TO RELATED APPLICATION

This application claims priority from and the benefit of Korean Patent Application No. 10-2013-0075117, filed on Jun. 28, 2013, which is hereby incorporated by reference for all purposes as if fully set forth herein.

BACKGROUND

1. Field

Exemplary embodiments of the present invention relate to a liquid crystal display having a touch sensor, and a manufacturing method of a liquid crystal display having a touch sensor.

2. Discussion of the Background

A touch sensor is a device which detects approach or contact of a user's hand or object, so as to assist in inputting a user's command to a display or the like.

To this end, the touch sensor is provided in an image display to convert a contact position of a user's hand or object into an electrical signal. Accordingly, an instruction content selected at the contact position is received as an input signal.

Because the touch sensor can be substituted for a separate input device connected to an image display device, such as a keyboard or a mouse, its application fields have been gradually extended.

Touch sensors may be divided into a resistive overlay touch sensor, a photosensitive touch sensor, a capacitive touch sensor, and the like. Among these touch sensors, the capacitive touch sensor converts a contact position into an electrical signal by sensing a change in capacitance between a conductive sensing electrode and an adjacent sensing electrode or ground electrode when a user's hand or object comes in contact with the touch screen panel.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a display device having a touch sensor, and a manufacturing method of a display device having a touch sensor, in which an electrode of a light emitting element is divided and formed into a plurality of electrodes, thereby implementing the function of a touch sensor.

Additional features of the invention will be set forth in the description which follows, and in part will become apparent from the description, or may be learned from practice of the invention.

An exemplary embodiment of the present invention discloses a display device having a touch sensor, including: a pixel defining layer; first electrodes exposed and arranged through the pixel defining layer; an emissive layer formed on each first electrode; second electrodes each connected to the emissive layer, the second electrodes arranged to be spaced apart from each other; and an insulating pattern formed on the pixel defining layer exposed between adjacent second electrodes.

An exemplary embodiment of the present invention also discloses a method of manufacturing a display device having a touch sensor, the method including: forming a pixel defining layer and a plurality of first electrodes exposed and arranged through the pixel defining layer; forming an insulating layer on the pixel defining layer and the first electrodes; forming a photoresist pattern on the insulating layer overlapped with the pixel defining layer; removing a portion of the insulating layer which is not covered by the photoresist pattern, thereby forming an insulating pattern; forming an emissive layer on each first electrode; laminating an electrode layer on the emissive layer and the photoresist pattern; and removing the photoresist pattern.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
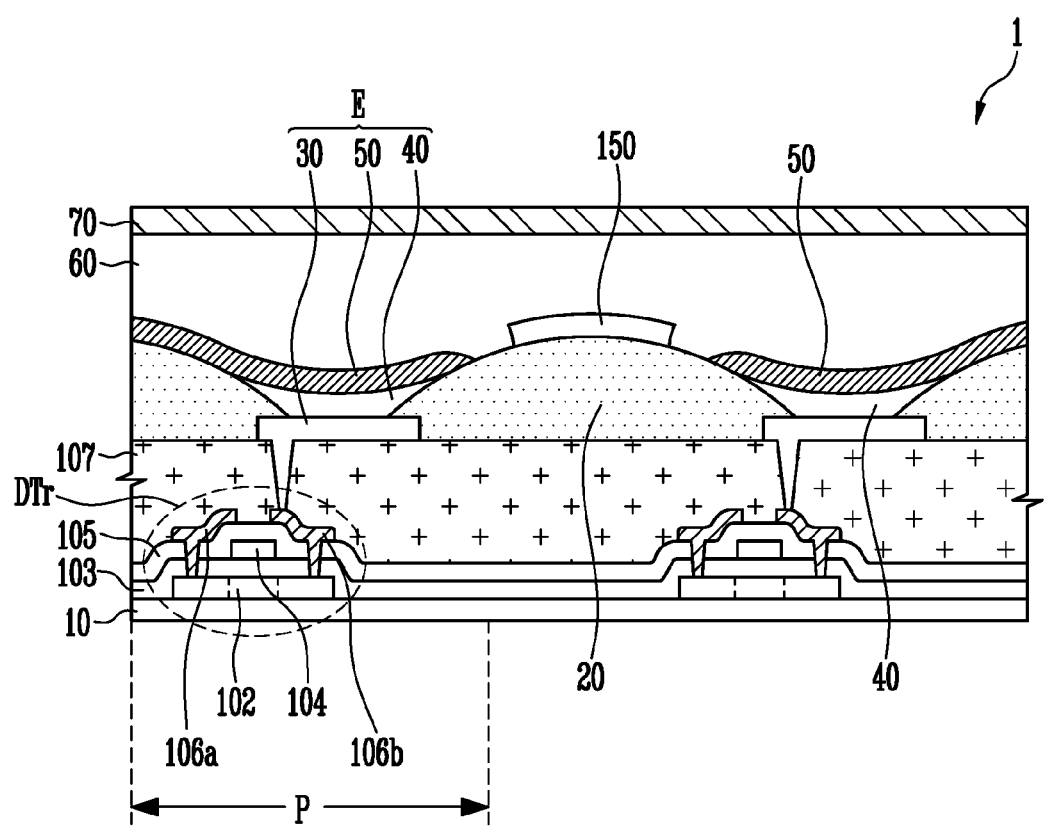
FIG. 1 is a sectional view illustrating a display device having a touch sensor according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of elements may be exaggerated for clarity. Like reference numerals in the drawings denote like elements.

It will be understood that when an element or layer is referred to as being "on"; "connected to"; or "coupled to" another element or layer, it can be directly on; directly connected to; or directly coupled to the other element or layer, or intervening elements or layers may be present. In contrast, when an element or layer is referred to as being "directly on"; "directly connected to"; or "directly coupled to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
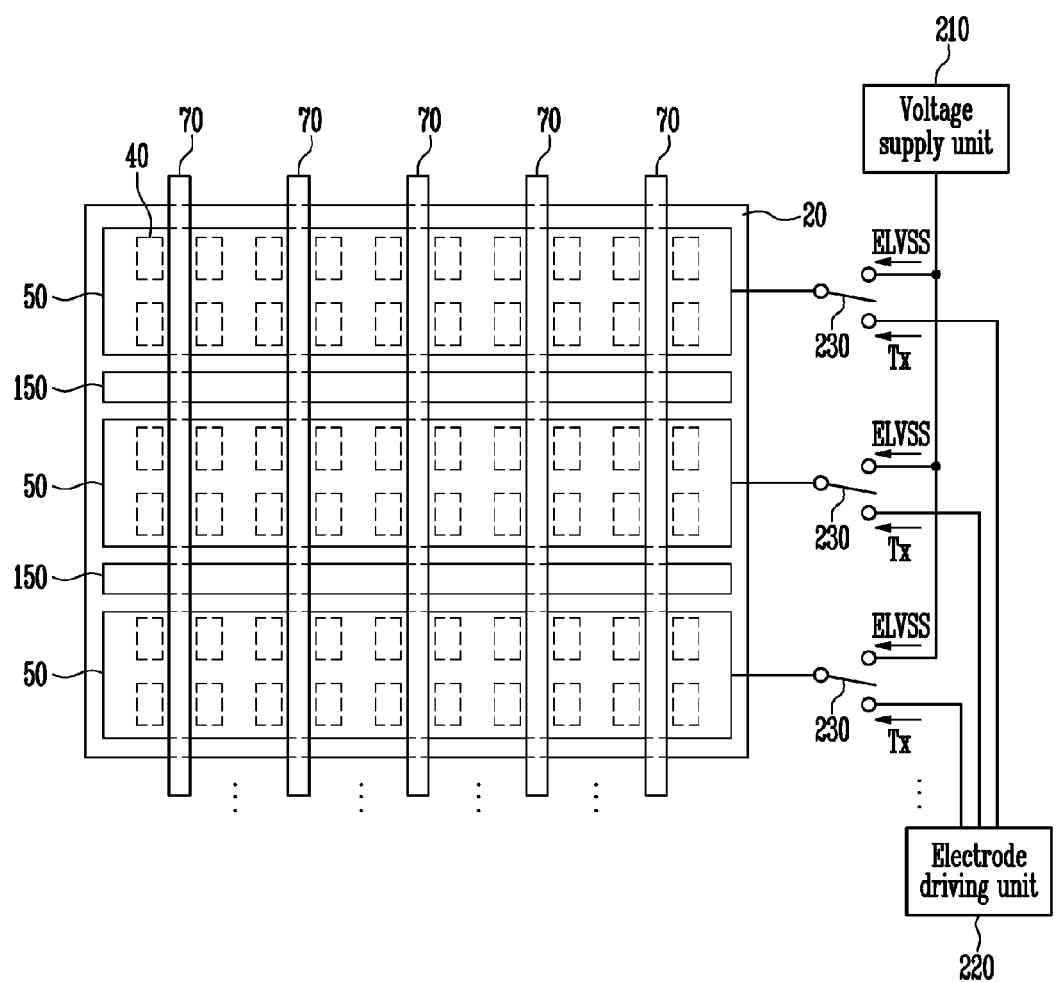
FIG. 2 is a view illustrating the structure of second electrodes and sensing electrodes in the display device having the touch sensor shown in FIG. 1.

FIG. 1 is a sectional view illustrating a display device having a touch sensor according to an exemplary embodiment of the present invention. FIG. 2 is a view illustrating the structure of second electrodes and sensing electrodes in the display device having the touch sensor shown in FIG. 1.

Referring to FIG. 1, the display device 1 includes a substrate 10, a plurality of pixels P formed on the substrate 10, and a plurality of sensing electrodes 70 disposed to be spaced apart from the pixels P at a preset distance. The substrate 10 may be made of a material having insulation properties, such as glass, plastic, silicon or a synthetic resin.

The substrate 10 may be implemented as a film having flexibility so as to be bendable or foldable. For example, the substrate 10 may be formed of a material such as polyethyleneterephthalate (PET), polycarbonate (PC), polymethylmethacrylate (PMMA), polyethylenenaphthalate (PEN), polyethersulfone (PES), cyclic olefin copolymer (COC), triacetylcellulose (TAC), polyvinyl alcohol (PVA), polyimide (PI), or polystyrene (PS).

The pixel P is configured to include a pixel circuit (not shown) including a driving transistor DTr and a light emitting element E. A plurality of pixels P may be arranged on the substrate 10.

For convenience of illustration, only the driving transistor DTr directly related to the light emitting element E has been illustrated in FIG. 1. However, in order to control emission of the light emitting element E, the pixel circuit (not shown) may additionally have another transistor, a capacitor, etc., in addition to the driving transistor DTr.

The driving transistor DTr is formed on the substrate 10. The driving transistor DTr is positioned corresponding to each light emitting element E.

Referring to FIG. 1, the driving transistor DTr may be configured to include a semiconductor layer 102, a gate insulating layer 103, a gate electrode 104, an interlayer insulating layer 105, and source/drain electrodes 106a and 106b. The semiconductor layer 102 may be formed in a pattern on the substrate 10, and may be formed of polysilicon obtained by crystallizing amorphous silicon deposited on the substrate 10, using laser radiation or the like. The semiconductor layer 102 may also be made of amorphous silicon, an oxide semiconductor, etc., as well as the polysilicon. In this case, a buffer layer (not shown) may be interposed between the substrate 10 and the semiconductor layer 102.

The buffer layer (not shown) is used to prevent diffusion of impurities contained in the substrate 10. The buffer layer (not shown) may be formed of an insulating material such as silicon oxide ($SiO_x$) or silicon nitride ($SiN_x$).

A gate insulating layer 103 may be formed on the semiconductor layer 102. The gate insulating layer 103 may be formed of an insulating material such as $SiO_x$ or $SiN_x$.

The gate electrode 104 may be formed in a pattern on the gate insulating layer 103. An interlayer insulating layer 105 may be formed on the gate electrode 104. Like the gate insulating layer 103, the interlayer insulating layer 105 may be formed of a preselected insulating material.

The gate insulating layer 103 may electrically insulate the semiconductor layer 102 and the gate electrode 104, and the interlayer insulating layer 105 may electrically insulate the gate electrode 104 and the source/drain electrodes 106a and 106b.

The source/drain electrodes 106a and 106b may be formed on the interlayer insulating layer 105. The source/drain electrodes 106a and 106b may be electrically connected respectively to opposing sides of the semiconductor layer 102 through contact holes formed in the gate insulating layer 103 and the interlayer insulating layer 105.

The gate electrode 104 and the source/drain electrodes 106a and 106b may be formed of a metal, such as molybdenum (Mo), tungsten (W), titanium (Ti) or aluminum (Al), an alloy thereof, or a stacked structure thereof. However, the present invention is not limited thereto.

The driving transistor DTr is not limited to the structure shown in FIG. 1, and may be changed into another structure.

A planarizing layer 107 is formed on the interlayer insulating layer 105 and the source/drain electrodes 106a and 106b. The planarizing layer 107 may include nitride or an oxide, but the present invention is not limited thereto.

A via hole may be formed in the planarizing layer 107 so that a portion of the source or drain electrode 106a or 106b is exposed therethrough, and a first electrode 30 connected to the source or drain electrode 106a or 106b through the via hole may be formed on the planarizing layer 107.

The first electrode 30 may constitute the light emitting element E, together with an emissive layer 40 and a second electrode 50. A pixel defining layer 20 is formed on the planarizing layer 107 so that at least one region of the first electrode 30 is exposed therethrough.

As shown in FIGS. 1 and 2, the pixel defining layer 20 may be disposed between the first electrodes 30.

The pixel defining layer 20 may be made of one of insulating materials such as an acrylic organic compound, a polyamide, and a polyimide, but the present invention is not limited thereto. That is, the pixel defining layer 20 may be formed of various insulating materials.

The plurality of first electrodes 30 exposed and arranged through the pixel defining layer 20 may be formed of various conductive materials.

The emissive layer 40 may be formed on the first electrode 30 exposed to the outside through the pixel defining layer 20. The emissive layer 40 may include an organic emission layer for self-luminescence. In this case, the emissive layer 40 may be formed into a structure in which a hole transporting layer, an organic emission layer, and an electron transporting layer are laminated. The emissive layer 40 may further include a hole injection layer and an electron injection layer.

The second electrode 50 may be formed on the emissive layer 40. Accordingly, holes injected from the first electrode 30 and electrons injected from the second electrode 50 are recombined in the organic emission layer, thereby generating excitons. Thus, light of a specific wavelength can be generated in each emissive layer 40 by energy released from the generated excitons.

The second electrode 50, as shown in FIG. 2, may be divided into a plurality of patterns. For example, the second electrode 50 has a long axis that extends in a first direction (e.g., an X-axis direction) so that a plurality of second electrodes 50 can be arranged along a second direction (e.g., a Y-axis direction) intersecting the first direction.

The second electrode 50 may be connected to each emissive layer 40 positioned on at least one row. For example, a state in which one second electrode 50 is connected to each emissive layer 40 positioned on two rows has been illustrated in FIG. 2.

In this case, the second electrode 50 may be formed of various conductive materials. For example, the second electrode 50 may be formed of a transparent conductive material so that light emitted in the emissive layer 40 is easily transmitted therethrough. However, the second electrode 50 may be formed of another conductive material, such as an opaque metal. For example, the second electrode may be formed of indium tin oxide (ITO), indium zinc oxide (IZO), graphene, carbon nanotube, silver nanowires (AgNWs), etc.

In this case, the second electrode 50 may time-divisionally receive a supply voltage ELVSS for normal emission of the emissive layer 40 and a touch driving signal Tx for driving the touch sensor. For example, the second electrodes 50 may progressively receive the touch driving signal Tx during a first period (touch detection period). The second electrodes 50 may all receive the supply voltage ELVSS during a second period (image display period). The first and second periods may be alternately repeated.

As shown in FIG. 2, the display device 1 may have a voltage supply unit 210 configured to generate a supply voltage ELVSS, an electrode driving unit 220 configured to generate a touch driving signal Tx, and a plurality of switches 230 configured to selectively supply the supply voltage ELVSS and the touch driving signal Tx to the second electrode 50.

The switch 230 electrically connects the second electrode 50 and the voltage supply unit 210, so that the supply voltage ELVSS can be supplied to the second electrode 50. In addition, the switch 230 electrically connects the second electrode 50 and the electrode driving unit 220, so that the touch driving signal Tx can be supplied to the second electrode 50.

In this case, an insulating pattern 150 may be interposed between adjacent second electrodes 50. The insulating pattern 150 may be formed on the pixel defining layer 20 exposed between the adjacent second electrodes 50.

The insulating pattern 150 is used to form the second electrode 50. A method of forming the second electrode 50 using the insulating pattern 150 will be described in detail later. For example, the insulating pattern 150 may be formed of $SiO_x$ or $SiN_x$.

The insulating pattern 150 may be spaced apart from each other at a preselected distance without coming in contact with the second electrode 50 adjacent thereto.

The sensing electrode 70 is spaced apart from the second electrode 50, so as to be driven with the second electrode 50, as a capacitive touch sensor. The sensing electrode 70 may intersect the second electrode 50.

For example, the sensing electrode 70 has a long axis that extends in the second direction so that sensing electrodes 70 can be arranged along the first direction. Thus, mutual capacitance exists between the second electrode 50 and the sensing electrode 70, and a change in capacitance, caused by a touch, can be detected, thereby detecting the position of the touch.

In order to sense multiple touches, the touch driving signal Tx may be progressively supplied to the second electrodes 50. That is, the supply voltage ELVSS may be supplied to the second electrode 50 during the image display period, and the touch driving signal Tx may be supplied to the second electrode 50 during the touch detection period.

In this case, the sensing electrode 70 may be formed of a transparent conductive material. However, the sensing electrode 70 may be formed of another conductive material such as an opaque metal. For example, the sensing electrode 70 may be formed of ITO, IZO, graphene, carbon nanotubes, AgNWs, etc.

In a case where the sensing electrode 70 is formed of an opaque metal in order to increase touch sensitivity by lowering resistance, the sensing electrode 70 may be positioned to overlap with the pixel defining layer 20, as shown in FIG. 2.

Accordingly, the sensing electrode 70 is disposed not to overlap with the emissive layer 40, thereby improving visibility.

The second electrode 50 and the sensing electrode 70 are spaced apart from each other at a preselected distance by, for example, an insulating member 60.

In a case where the insulating member 60 is positioned on the second electrode 50 as shown in FIG. 1, the sensing electrode 70 may be positioned on an upper surface of the insulating member 60.

The insulating member 60 may be as a single-layered structure or a multi-layered structure.

Unlike what is shown in FIG. 1, the insulating member 60 may be spaced apart from the second electrode 50. In this case, the sensing electrode 70 may be positioned on not only the upper surface but also a lower surface of the insulating layer 60.

A process of dividing and forming the second electrode 50 is performed in order to manufacture the display device 1 having the touch sensor configured, as described above. However, there is a problem in that the process is complicated.

Accordingly, a manufacturing method of the display device having the touch sensor, which is further improved as follows, is proposed, and a process of dividing and forming the second electrode 50 will be mainly described below.

FIGS. 3A to 3F are sectional views illustrating a manufacturing method of the display device having the touch sensor according to an exemplary embodiment of the present invention.

The manufacturing method of the display device 1 having the touch sensor according to this exemplary embodiment will be described with reference to FIGS. 3A to 3F.

Figure 3A:
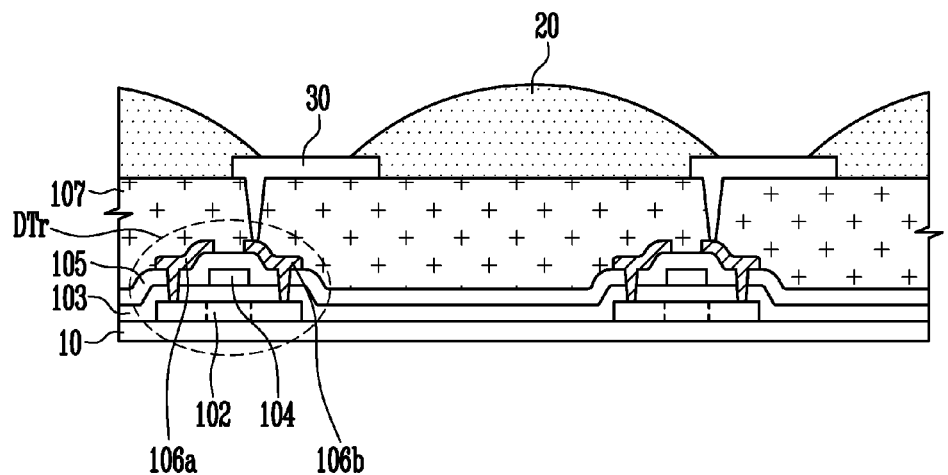
FIG. 3A, FIG. 3B, FIG. 3C, FIG. 3D, FIG. 3E, and FIG. 3F are sectional views illustrating a manufacturing method of the display device having the touch sensor according to an exemplary embodiment of the present invention.

Referring to FIG. 3A, a pixel defining layer 20 and first electrodes 30 exposed to the outside through the pixel defining layer 20 are formed on a substrate 10.

After the first electrodes 30 are patterned, the pixel defining layer 20 may be formed. However, after the pixel defining layer 20 is formed, the first electrodes 30 may be patterned.

As described above, a pixel circuit (a driving transistor DTr is representatively illustrated in FIGS. 3A to 3F), a planarizing layer 107, etc., may be formed on the substrate 10.

In this case, the first electrode 30 may be connected to a drain electrode 106b of the driving transistor DTr.

Figure 3B:
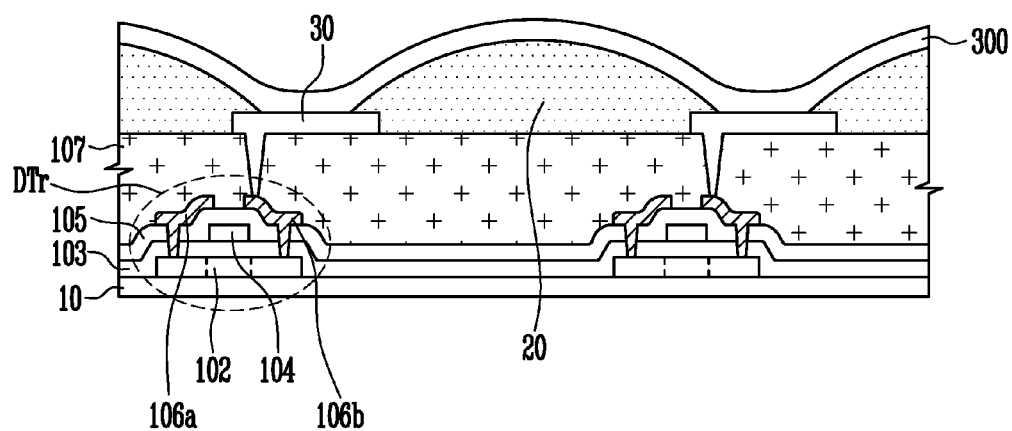

An insulating layer 300 is then formed, as shown in FIG. 3B.

The insulating layer 300 may be positioned on the pixel defining layer 20 and the first electrodes 30. In this case, the insulating layer 300 may be formed of $SiO_x$ or $SiN_x$.

Figure 3C:
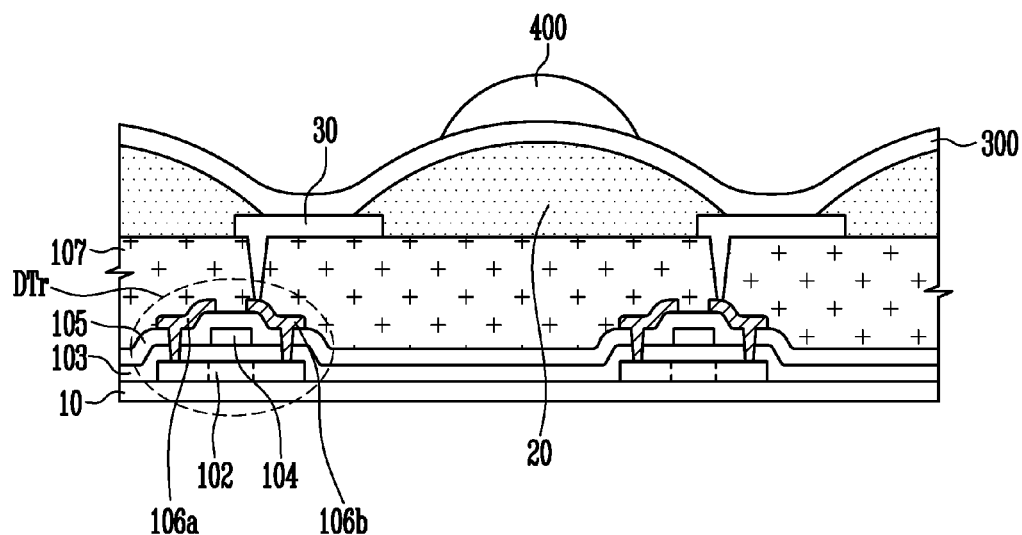

Subsequently, a photoresist pattern 400 is formed, as shown in FIG. 3C.

The photoresist pattern 400 may be disposed on the insulating layer 300 overlapped with the pixel defining layer 20. That is, the photoresist pattern 400 may be formed at the portion of the insulating layer 300 which overlaps the pixel defining layer 20 through a photolithography process. Accordingly, a portion of the insulating layer 300 is positioned between the pixel defining layer 20 and the photoresist pattern 400.

Figure 3D:
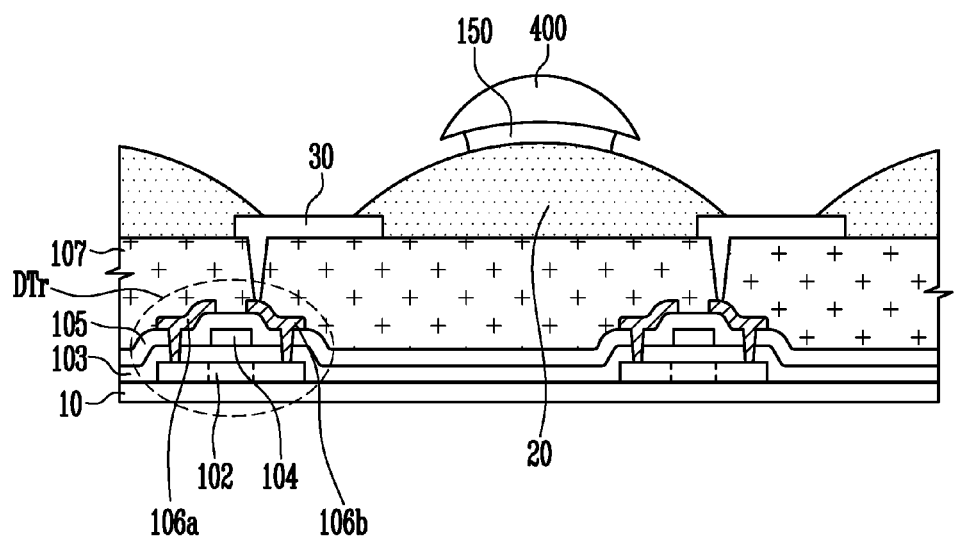

Subsequently, as shown in FIG. 3D, an insulating pattern 150 is formed by removing part of the insulating layer 300. In this case, the portion of the insulating layer 300 which is not covered by the photoresist pattern 400 may be removed through an etching process. Thus, only the portion of the insulating layer remains that is positioned between the pixel defining layer 20 and the photoresist pattern 400. In this case, the remaining insulating layer may become the insulating pattern 150. The first electrodes 30 may be exposed through the etching process.

In this operation, a wet etching process having anisotropy may be performed in order to etch a portion of the insulating layer 300 positioned beneath the photoresist pattern 400. That is, an undercut for the insulating layer 300 covered by the photoresist pattern 400 is included through the wet etching process so that a second electrode 50 can be more easily divided in a subsequent process. In this case, the wet etching process may be performed after a dry etching process having anisotropy is performed for a certain period of time. For example, after the dry etching process is performed, the wet etching process may be performed until the thickness of the insulating layer 300 becomes about 300 to 500 Å.

Figure 3E:
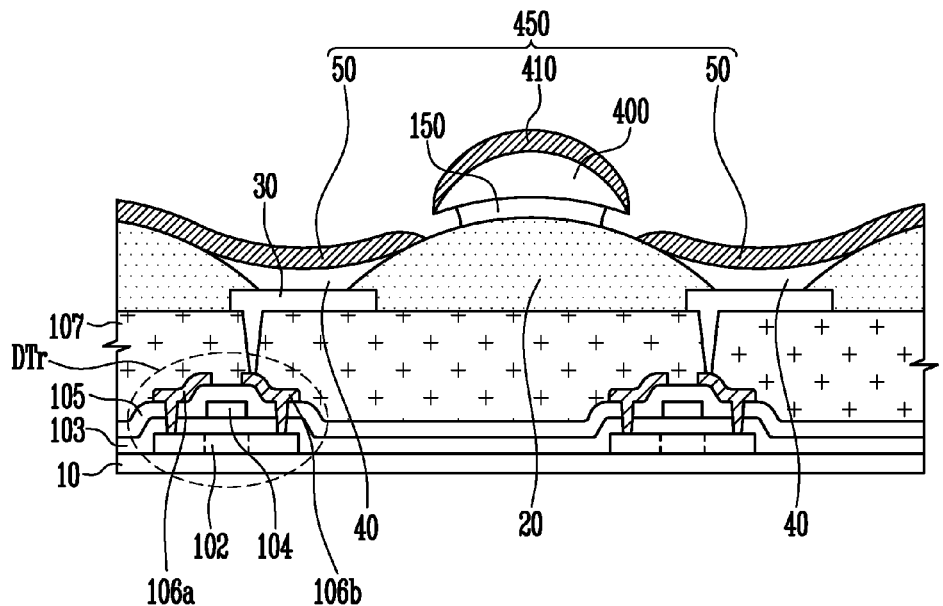

Subsequently, as shown in FIG. 3E, an emissive layer 40 is formed on the first electrode 30 exposed through the etching process. Then, an electrode layer 450 is laminated on the emissive layer 40 and the photoresist pattern 400.

Accordingly, the electrode layer 450 is cut using the photoresist pattern 400 as a boundary. The electrode layer 450 may be divided into a plurality of second electrodes 50. That is, the electrode layer 450 may include a portion 410 positioned on the photoresist pattern 400, and second electrodes 50 divided by the portion 410 positioned on the photoresist pattern 400. The electrode layer 450 may be formed through a process of depositing a conductive material.

Figure 3F:
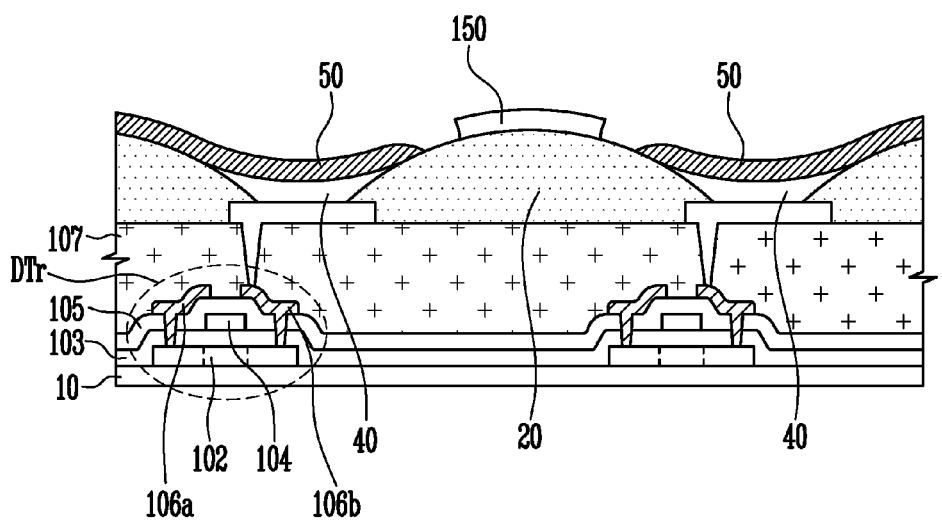

The photoresist pattern 400 is then removed, as shown in FIG. 3F. That is, the photoresist pattern 400 positioned on the remaining insulating pattern 150 may be stripped. Accordingly, a portion of the insulating pattern 150 may remain on the pixel defining layer 20.

Subsequently, a sensing electrode 70 is formed. Here, the sensing electrode 70 is spaced apart from the second electrode 50, so as to be driven, together with the second electrode 50, as a capacitive touch sensor.

Figure 4:
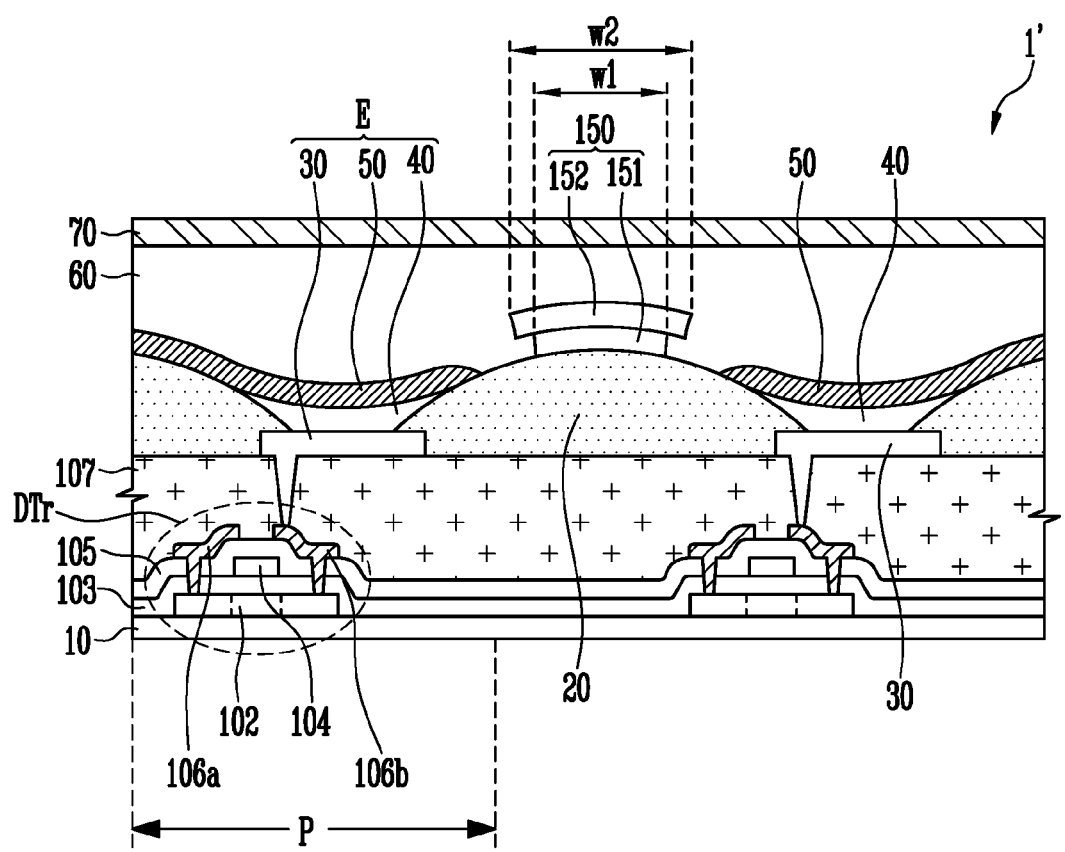
FIG. 4 is a sectional view illustrating a display device having a touch sensor according to another exemplary embodiment of the present invention.

FIG. 4 is a sectional view illustrating a display device 1' having a touch sensor according to another exemplary embodiment of the present invention.

In the display device 1', the insulating pattern 150 may include a first insulating pattern 151 and a second insulating pattern 152.

The first insulating pattern 151 may be disposed at a lower portion of the insulating pattern 150, and the second insulating pattern 152 may be disposed on the first insulating pattern 151. In this case, the etching rates of the first and second insulating patterns 151 and 152 with respect to the same etching process may be different from each other.

In order to facilitate the division of the electrode layer 450 in a subsequent process, the width w2 of the second insulating pattern 152 may be greater than the width w1 of the first insulating pattern 151.

In a case where the etching rate of the first insulating pattern 151 is higher than that of the second insulating pattern 152, more of the first insulating pattern 151 is removed than the second insulating pattern 152, and therefore, the width w1 of the first insulating pattern 151 may be less than that w2 of the second insulating pattern 152. For example, the first insulating pattern 151 may be formed of any one of $SiO_x$ and $SiN_x$, and the second insulating pattern 152 may be formed of the other of the $SiO_x$ and the $SiN_x$. That is, in a case where the first insulating pattern 151 is formed of silicon oxide, the second insulating pattern 152 may be formed of silicon nitride. In a case where the first insulating pattern 151 is formed of silicon nitride, the second insulating pattern 152 may be formed of silicon oxide.

FIGS. 5A to 5F are sectional views illustrating a manufacturing method of the display device 1' having the touch sensor according to an exemplary embodiment of the present invention.

Figure 5A:
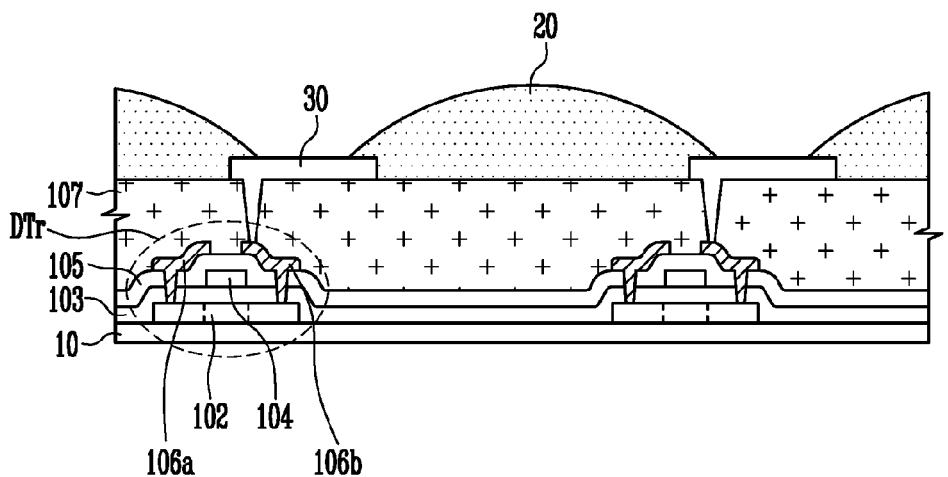
FIG. 5A, FIG. 5B, FIG. 5C, FIG. 5D, FIG. 5E, and FIG. 5F are sectional views illustrating a manufacturing method of the display device having the touch sensor according to an exemplary embodiment of the present invention.

Referring to FIG. 5A, a pixel defining layer 20 and first electrodes 30 exposed to the outside through the pixel defining layer 20 are formed on a substrate 10.

After the first electrodes 30 are patterned, the pixel defining layer 20 may be formed. However, after the pixel defining layer 20 is formed, the first electrodes 30 may be patterned.

As described above, a pixel circuit (a driving transistor DTr is representatively illustrated in FIGS. 5A to 5F), a planarizing layer 107, etc., may be formed on the substrate 10. T the first electrode 30 may be connected to a drain electrode 106b of the driving transistor DTr.

Figure 5B:
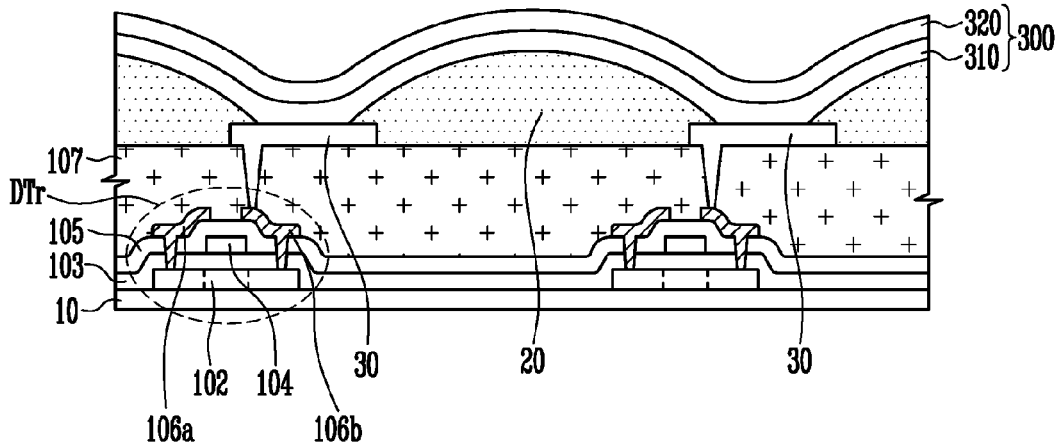

An insulating layer 300 is then formed, as shown in FIG. 5B.

In this exemplary embodiment, the insulating layer 300 may include two insulating layers 310 and 320. The first insulating layer 310 may be positioned on the pixel defining layer 20 and the first electrodes 30, and the second insulating layer 320 may be positioned on the first insulating layer 310. In this case, the etching rates of the first and second insulating layers 310 and 320 may be different from each other.

In order to easily form a second electrode 50 in a subsequent process, the etching rate of the first insulating layer 310 with respect to the same etching process may be greater than that of the second insulating layer 320. For example, the first insulating layer 310 may be formed of any one of $SiO_x$ and $SiN_x$, and the second insulating layer 320 may be formed of the other of the $SiO_x$ and the $SiN_x$.

Figure 5C:
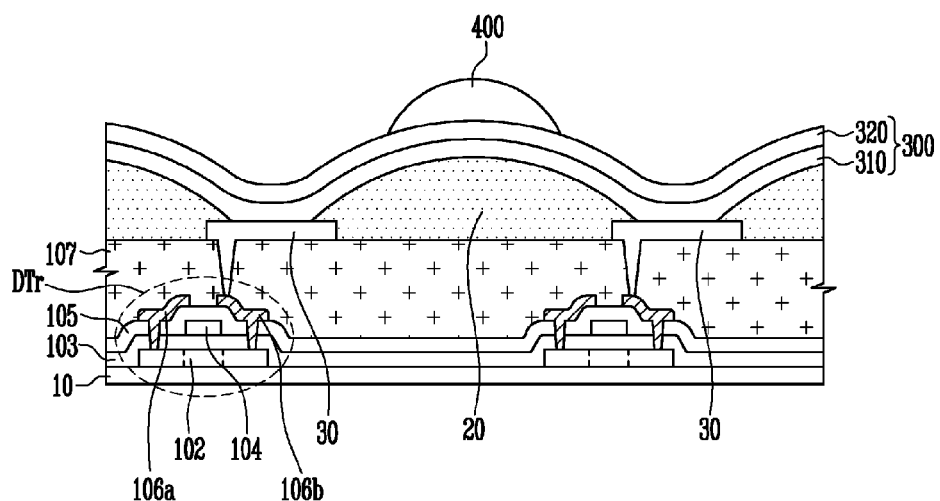

Subsequently, a photoresist pattern 400 is formed, as shown in FIG. 5C.

The photoresist pattern 400 may be formed at the portion of the insulating layer 300, which is overlapped with the pixel defining layer 20, through a photolithography process. As a result, the photoresist pattern 400 may be positioned on the second insulating layer 320 overlapped with the pixel defining layer 20. Accordingly, portions of the first and second insulating layers 310 and 320 are positioned between the pixel defining layer 20 and the photoresist pattern 400.

Figure 5D:
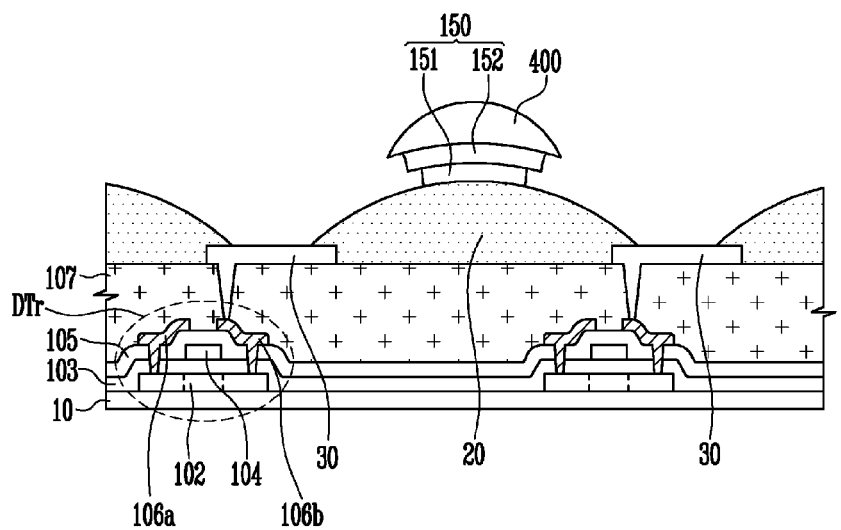

Subsequently, as shown in FIG. 5D, an insulating pattern 150 is formed by removing a partial region of the insulating layer 300. In this case, the portion of the insulating layer 300 which is not covered by the photoresist pattern 400 may be removed through an etching process.

Thus, only the portion of the insulating layer 300, positioned between the pixel defining layer 20 and the photoresist pattern 400, remains. In this case, the remaining insulating layer 300 may become the insulating pattern 150. The first electrodes 30 may be exposed through the etching process. For example, the remaining first insulating layer 310 may become a first insulating pattern 151, and the remaining second insulating layer 320 may become a second insulating pattern 152.

In a case where the first insulating layer 310 is formed of the $SiO_x$ and the second insulating layer 320 is formed of the $SiN_x$, the etching rate of the $SiO_x$ with respect to a wet etching process is higher than that of the $SiN_x$. Therefore, the wet etching process may be used in this operation.

Accordingly, the lower first insulating layer 310 is etched to a greater extent than the upper second insulating layer 320 and, thus, the width w1 of the remaining first insulating pattern 151 becomes smaller than the width w2 of the remaining second insulating pattern 152.

In a case where the first insulating layer 310 is formed of the $SiN_x$ and the second insulating layer 320 is formed of the $SiO_x$, the etching rate of the $SiN_x$ with respect to a dry etching process is higher than that of the $SiO_x$. Therefore, the dry etching process may be used instead of the wet etching process in this operation.

Accordingly, as shown in FIG. 5D, the lower first insulating layer 310 is etched to a greater extent than the upper second insulating layer 320 and, thus, the width w1 of the remaining first insulating pattern 151 becomes smaller than the width w2 of the remaining second insulating pattern 152.

Figure 5E:
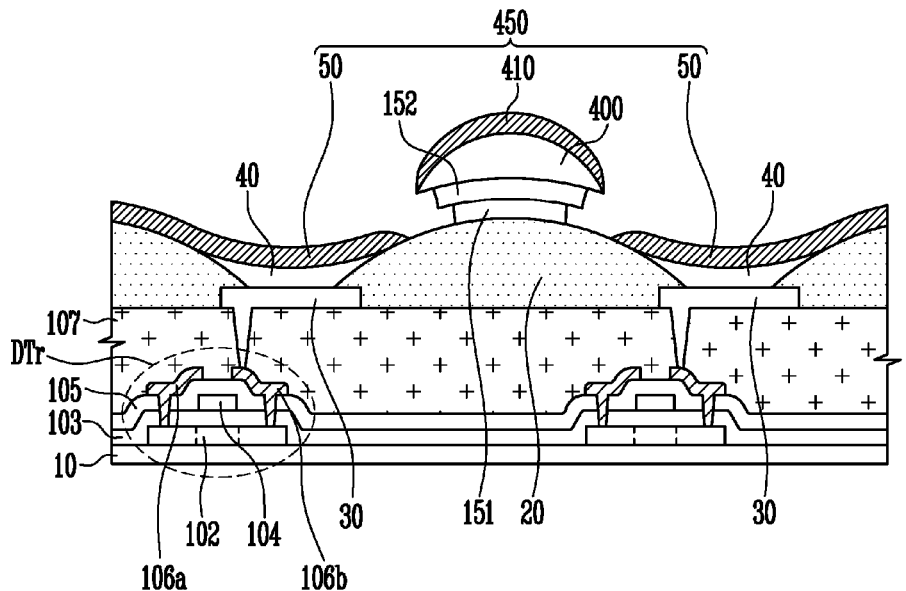

Subsequently, as shown in FIG. 5E, an emissive layer 40 is formed on the first electrode 30 exposed through the etching process. Then, an electrode layer 450 is laminated on the emissive layer 40 and the photoresist pattern 400. The electrode layer 450 is then cut using the photoresist pattern 400 as a boundary. The electrode layer 450 may be divided into a plurality of second electrodes 50. That is, the electrode layer 450 may include a portion 410 positioned on the photoresist pattern 400, and second electrodes 50 divided by the portion 410 positioned on the photoresist pattern 400. The electrode layer 450 may be formed through a process of depositing a conductive material.

Figure 5F:
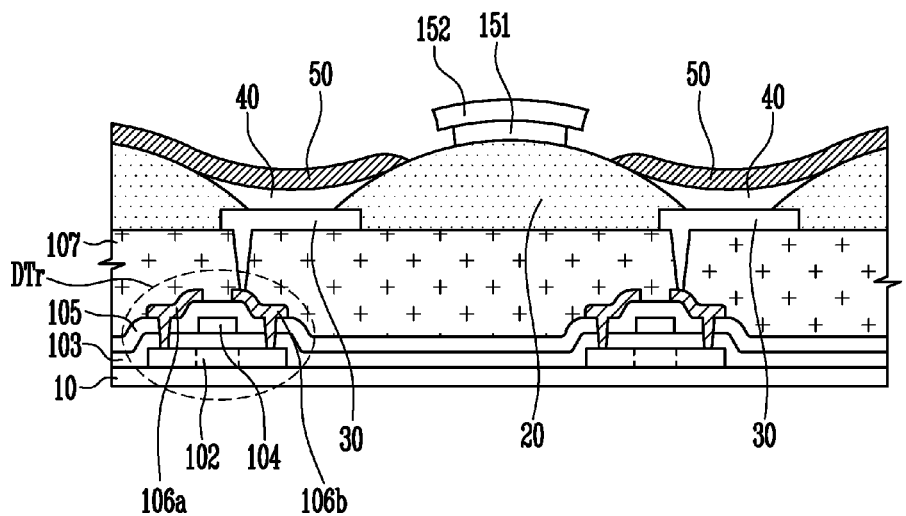

Next, the photoresist pattern 400 is removed, as shown in FIG. 5F.

The photoresist pattern 400 positioned on the remaining insulating pattern 150 may be stripped, thereby leaving the first and second insulating patterns 151 and 152 on the pixel defining layer 20.

Subsequently, a sensing electrode 70 is formed, as shown in FIG. 4. Here, the sensing electrode 70 is spaced apart from the second electrode 50, so as to be driven, together with the second electrode 50, as a capacitive touch sensor.

In summary, the related art touch sensor has been frequently commercialized by being attached to an outer surface of a flat panel display, such as a liquid crystal display or organic light emitting display. However, in a case where the touch sensor is attached to the outer surface of the flat panel display, a cohesive layer between the touch sensor and the flat panel display is necessary, and a process of forming the touch sensor is required separately from the flat panel display. Therefore, both processing time and manufacturing costs are necessarily increased. Further, as the touch sensor is attached to the outer surface of the flat panel display, the entire thickness of the related art flat panel display is increased.

As described above, according to the present invention, it is possible to provide a manufacturing method of a display device having a touch sensor, in which an electrode of a light emitting element is divided into a plurality of electrodes, thereby implementing the function of a touch sensor.

Exemplary embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device having a touch sensor, comprising:
first electrodes;
a pixel defining layer disposed on the first electrodes, the pixel defining layer comprising openings exposing the first electrodes;
an emissive layer disposed on each first electrode;
second electrodes connected to the emissive layer, the second electrodes being spaced apart from each other;
an insulating pattern disposed directly on the pixel defining layer between adjacent second electrodes; and
sensing electrodes spaced apart from the second electrodes and configured to be driven, together with the second electrodes, as a capacitive touch sensor.

2. The display device of claim 1, wherein the sensing electrodes and the second electrodes intersect each other.

3. The display device of claim 1, wherein each of the second electrodes is connected to groups of the emissive layers arranged in at least one row.

4. The display device of claim 1, further comprising:
an electrode driving unit configured to progressively provide a touch driving signal to the second electrodes during a first period; and
a voltage supply unit configured to supply a supply voltage during a second period.

5. The display device of claim 4, wherein the first and second periods are alternately repeated.

6. The display device of claim 1, wherein the sensing electrode overlaps the pixel defining layer.

7. The display device of claim 1, wherein the insulating pattern is spaced apart from the second electrode.

8. The display device of claim 1, wherein the insulating pattern comprises silicon oxide or silicon nitride.

9. The display device of claim 1, wherein the insulating pattern comprises a first insulating pattern and a second insulating pattern disposed on the first insulating pattern.

10. The display device of claim 9, wherein etching rates of the first and second insulating patterns are different from each other.

11. The display device of claim 9, wherein the second insulating pattern has a width greater than that of the first insulating pattern.

12. The display device of claim 9, wherein the first insulating pattern has an etching rate higher than that of the second insulating pattern.

13. The display device of claim 9, wherein:
the first insulating pattern comprises one of silicon oxide and silicon nitride; and
the second insulating pattern comprises the other of silicon oxide and silicon nitride.

* * * * *